(12) United States Patent
Chopra et al.

(10) Patent No.: US 10,324,822 B1
(45) Date of Patent: Jun. 18, 2019

(54) DATA ANALYTICS IN A SOFTWARE DEVELOPMENT CYCLE

(71) Applicant: EMC Corporation, Hopkinton, MA (US)

(72) Inventors: Shelesh Chopra, Karanataka (IN); Swapnadeep Deb Kanunjna, Karanataka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 286 days.

(21) Appl. No.: 14/788,071

(22) Filed: Jun. 30, 2015

(51) Int. Cl.
*G06F 11/36* (2006.01)
(52) U.S. Cl.
CPC ................. *G06F 11/3616* (2013.01)
(58) Field of Classification Search
CPC .................................................. G06F 11/3616
USPC ....................................................... 717/124
See application file for complete search history.

(56) References Cited

U.S. PATENT DOCUMENTS

| | | | | |
|---|---|---|---|---|
| 8,924,935 B1 * | 12/2014 | Chopra | ...................... | G06F 8/71 717/120 |
| 2009/0210854 A1 * | 8/2009 | Carteri | ................... | G06Q 10/00 717/102 |
| 2013/0024842 A1 * | 1/2013 | Browne | ............... | G06F 11/3676 717/125 |
| 2015/0082281 A1 * | 3/2015 | Koenig | ................. | G06F 11/008 717/124 |
| 2015/0135158 A1 * | 5/2015 | Tenev | ................. | G06F 11/3684 717/101 |

* cited by examiner

*Primary Examiner* — Emerson C Puente
*Assistant Examiner* — Sen Thong Chen
(74) *Attorney, Agent, or Firm* — Womble Bond Dickinson (US) LLP

(57) ABSTRACT

Embodiments describe methods, apparatuses, and systems for performing data analytics on one or more features of software under development. In one exemplary embodiment, a data mining module receives a first set of data including an expected timeline of a plurality of features of program code being developed. The data mining module further retrieves a second set of data from a program testing system based on the first set of data. The second set of data includes defect information and a testing result for each of the plurality of features indicated in the first set of data. Moreover, a data analysis module executed performs an analysis on the first and second sets of data. Based on the analysis, a report generator generates an analysis report that includes an expected defect level and an actual defect level of each of the plurality of features.

15 Claims, 16 Drawing Sheets

| PHASE 501 | Expected. pass% 503 | Expected Defect backlog 505 | Expected Delivery % 507 | Feature X Pass % 509 | Feature X Defect Backlog 511 | Feature X Delivery % 513 | FINAL STATUS of Feature X 515 |
|---|---|---|---|---|---|---|---|
| T0 | 60 | 40 | 25 | 75 | 40 | 30 | ON TRACK |
| T1 | 70 | 30 | 50 | 63 | 30 | 45 | SLIPPED |
| T2 | 85 | 20 | 75 | 88 | 20 | 75 | ON TRACK |
| T3 | 95 | 0 | 100 | 96 | 0 | 100 | SHIP READY |

FIG. 5

```
<defect_details>
    <project>
        <pid>3</pid>
        <name>Redhook</name>
        <version>8.0</version>
        <def_version_found>8.0</def_version_found>
        <def_planned_rel>8.0</def_planned_rel>
        <def_branch>dev</def_branch>
    </project>
    <project>
        <pid>5</pid>
        <name>Spaten</name>
        <version>8.2</version>
        <def_version_found>8.2</def_version_found>
        <def_planned_rel>8.2</def_planned_rel>
        <def_branch>nw_8_2_dev</def_branch>
    </project>
    <project>
        <pid>11</pid>
        <name></name>
        <version>8.2.1</version>
        <def_version_found>8.2.1</def_version_found>
        <def_planned_rel>8.2.1</def_planned_rel>
        <def_branch>nw_8_2_dev</def_branch>
    </project>
    <project>
        <pid>13</pid>
        <name>Cumulative - 8.0.1.1</name>
        <version>8.0.1.1</version>
        <def_version_found>8.0.1</def_version_found>
        <def_planned_rel>8.0.1</def_planned_rel>
        <def_branch>nw_8_0_1_dev</def_branch>
    </project>
</defect_details>
```

FIG. 6A

```xml
<exec_details>
    <project>
        <pid>3</pid>
        <name>Redhook</name>
        <version>8.0</version>
        <qc>
            <domain>CORE_NETWORKER</domain>
            <prj>Redhook</prj>
        </qc>
    </project>
    <project>
        <pid>5</pid>
        <name>Spaten</name>
        <version>8.2</version>
        <qc>
            <domain>CORE_NETWORKER</domain>
            <prj>Spaten</prj>
        </qc>
    </project>
    <project>
        <pid>11</pid>
        <name></name>
        <version>8.2.1</version>
        <qc>
            <domain>CORE_NETWORKER</domain>
            <prj>NW_821</prj>
        </qc>
    </project>
    <project>
        <pid>13</pid>
        <name>Cumulative - 8.0.1.1</name>
        <version>8.0.1.1</version>
        <qc>
            <domain>CORE_NETWORKER</domain>
            <prj>NW_811</prj>
        </qc>
    </project>
</exec_details>
```

```
data.json
  {
  "harmony" : {
        "pid" : "54",
        "qc_domain" : "CORE_NETWORKER",
        "qc_prj" : "Harmony",
        "version_found" : "8.5",
        "planned_rel" : "Harmony, 8.5",
        "branch" : "8.5, dev"
        }
  }
```

| Submittal for Execution of Software 901 | Total 903 | Passed 905 | Blocked 907 | Failed 909 | NoRun 911 | N/A 913 | Not Completed 915 | Test Execution Exposure Rate 917 | Test Success Rate 919 |
|---|---|---|---|---|---|---|---|---|---|
| Submittal #1 | 265 | 194 | 0 | 50 | 6 | 10 | 5 | 96% | 80% |
| Submittal #2 | 567 | 401 | 56 | 87 | 4 | 19 | 0 | 89% | 82% |
| Submittal #3 | 495 | 356 | 5 | 65 | 10 | 59 | 0 | 97% | 85% |
| Submittal #4 | 461 | 342 | 0 | 91 | 0 | 28 | 0 | 100% | 79% |
| Submittal #5 | 1233 | 951 | 0 | 210 | 6 | 66 | 0 | 99% | 82% |
| Submittal #6 | 1523 | 1184 | 0 | 210 | 0 | 129 | 0 | 100% | 85% |
| Submittal #7 | 1962 | 1219 | 363 | 294 | 0 | 86 | 0 | 81% | 81% |
| Submittal #8 | 1415 | 1106 | 31 | 89 | 0 | 189 | 0 | 97% | 93% |
| Submittal #9 | 1330 | 708 | 301 | 134 | 0 | 187 | 0 | 74% | 84% |
| Submittal #10 | 1986 | 1306 | 101 | 366 | 0 | 213 | 0 | 94% | 78% |
| Submittal #11 | 116 | 87 | 0 | 23 | 0 | 6 | 0 | 100% | 79% |
| Submittal #12 | 1598 | 995 | 215 | 251 | 0 | 137 | 0 | 85% | 80% |
| Submittal #13 | 640 | 429 | 78 | 97 | 0 | 36 | 0 | 87% | 82% |

Execution Report Table 900

DATA ANALYTICS IN A SOFTWARE DEVELOPMENT CYCLE

FIELD

Embodiments described herein relate generally to software development. More particularly, the embodiments described herein relate to analyzing data including one or more software metrics about software under development.

BACKGROUND

Development of the software is generally subjected to rigorous software testing. Software testing is a major component in a software development cycle. Some of the techniques used for software testing include executing a program or application with the intent of finding software bugs, errors, or other defects. This testing can provide information about software quality. Ideally, software testing should provide an objective, independent view of the software to allow the stakeholders to appreciate and understand the risks of software implementation. In reality, however, software testing faces many challenges. One challenge that occurs during the software development cycle relates to the creation of an abstracted view that can provide stakeholders with the health of the software-under-test or a feature of the software-under-test in a consistent and uniform fashion. Generally, stakeholders are provided with a plethora of metrics that can be complicated to comprehend or understand.

Many of the presently-available tools and methods of software testing can be viewed as being focused more on information gathering than an objective analysis or logical correlation of the gathered information. For example, there are a plurality of models and tools available on code coverage/discovery, resolution rates, code density, defect density, bugs per line of code, cohesion, comment density, connascent software components, coupling, cyclomatic complexity, design structure quality index (DSQI), instruction path length, maintainability index, number of classes and interfaces, number of lines of code, number of lines of customer requirements, program execution time, program load time, program size, etc. Many of these models and tools are developed and endorsed by different companies/authors and there is little standardization between these models and tools. This lack of coherency can prevent stakeholders from obtaining a complete view of the health of the software-under-test or the health of a feature of the software-under-test.

BRIEF DESCRIPTION OF THE DRAWINGS

Embodiments of the invention are illustrated by way of example and not limitation in the figures of the accompanying drawings in which like references indicate similar elements.

In FIG. 2, additional details are provided about the storage system illustrated in FIG. 1.

FIG. 5 is a table illustrating an end result of data analytics performed on software under development according to one embodiment of the invention. In FIG. 5, the table is included in a report generated by a report generation module.

FIGS. 6A-6B are graphical diagrams illustrating non-limiting examples of extensible markup language (XML) files that are used as inputs for performing data analytics on software under development according to one embodiment.

FIG. 7 is a graphical diagram illustrating a non-limiting example of an input in a JavaScript Object Notation (JSON) format that is provided to a data mining module according to one embodiment.

DETAILED DESCRIPTION

Figure 1:
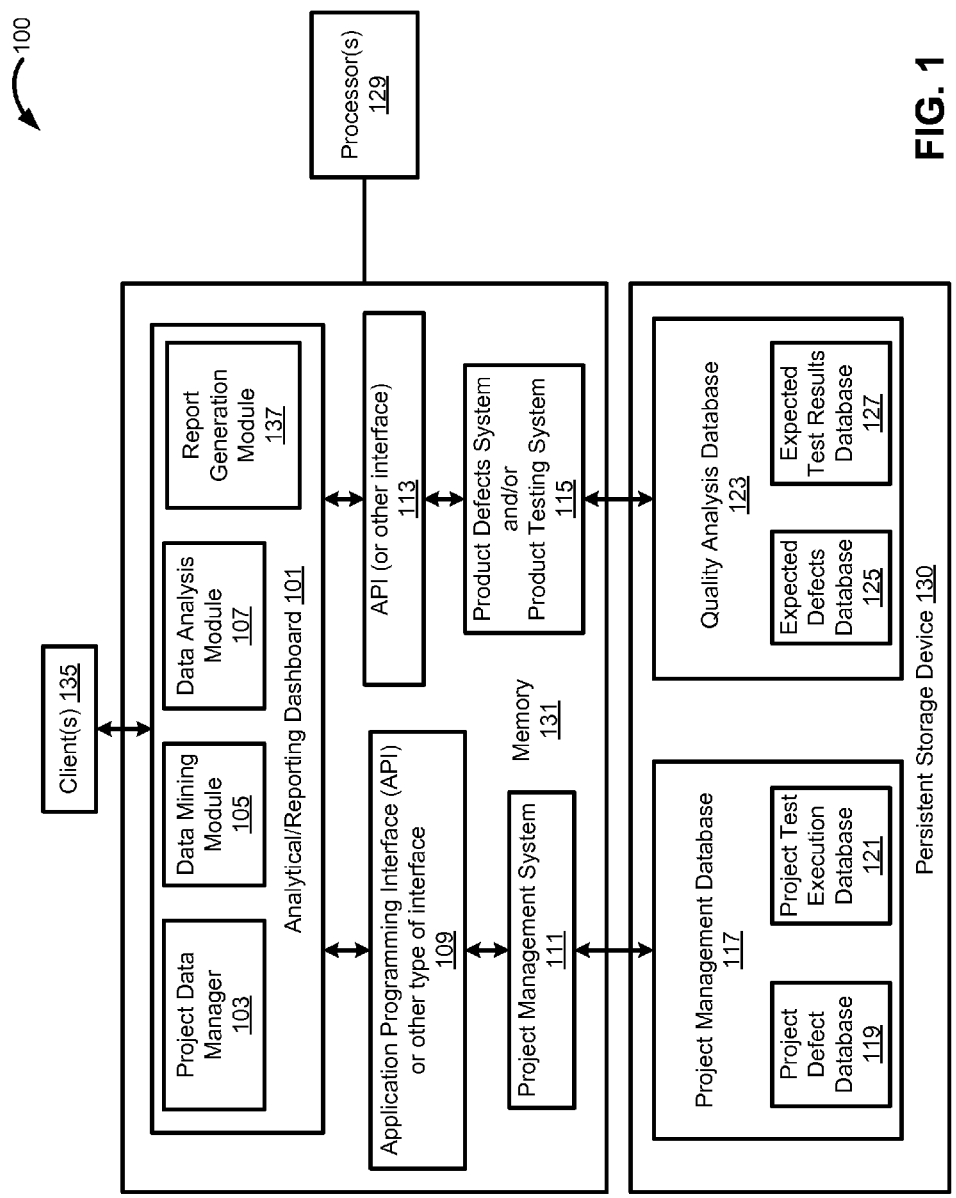
FIG. 1 is a block diagram illustrating a storage system capable of performing data analytics on software under development according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a software development system includes a data analytics system. In one embodiment, the data analytics system includes one or more processors for executing one or more modules that perform data analytics and report generation based on data provided to or stored in the software development system. In one embodiment, a project data manager executed by the processor(s) of the software development system accesses a project management system to obtain a first set of data. In one embodiment, the first set of data includes an expected timeline of components or features of program code under development. In one embodiment, the first set of data also includes one or more development stages that are each associated with a predetermined stage timeline at which a predetermined number of defects are corrected. In one embodiment, the expected timeline includes the one or more development stages or milestones. In one embodiment, the project management system is accessed via an application programming interface (API) or plugin interface. In one embodiment, the project management system is a separate system from a program testing system (e.g., QA system), which is stores a second set of data. In one embodiment, the first set of data is received by a data mining module executed by the processor(s).

In one embodiment, the data mining module also retrieves a second set of data from a program testing system based on the first set of data. In one embodiment, the data mining module performs the retrieval of the second set of data by retrieving defect data from a defect database of a product defect system. In one embodiment, the data mining module performs the retrieval of the second set of data by retrieving test data from a test result database of a product test management system. In one embodiment, at least one of the defect data or the test data is retrieved via an API. In one embodiment, the second set of data includes defect information and a testing result for each of the plurality of features or development stages indicated in the first set of data. In one embodiment, the second set of data also includes an actual defect level for each of the development stages.

In one embodiment, a data analysis module executed by the processor(s) performs an analysis on the first and second sets of data. In one embodiment, at least one of the first or second sets of data is in a format compatible with extensible markup language (XML). In one embodiment, at least one of the first or second sets of data is processed. In one embodiment, the analysis includes applying at least one of a rule or an algorithm stored in the data analysis module to the first and second sets of data. In one embodiment, output from the data analysis module is provided to a report generator executed by the one or more processors, which generates an analysis report based on the analyzed data. In one embodiment, the analytic report includes at least one of an expected defect level, an actual defect level of each of the plurality of features, or a trend analysis of the expected and actual defect levels over a predetermined period of time. In one embodiment, the data analysis module compares, for each of the plurality of development stages, the expected defect level and the actual defect level and provides the results of the comparison to the report generation module. In one embodiment, the report generation module indicates, in the analytic report, whether the corresponding development stage is on track. As a result, one can obtain a full report of software development at different stages, contrary to a conventional system in which a user can only obtain a partial report, which requires many manual processes.

FIG. 1 is a block diagram illustrating a software development system 100 capable of performing data analytics on software under development according to one embodiment. It is to be appreciated that certain details have been omitted from the system 100 of FIG. 1 in order to avoid obscuring the invention.

In one embodiment, software development system 100 includes analytical/reporting dashboard 101 configured to perform data analytics on software under development. In one embodiment, the performance of data analytics is triggered based on requests from a client (e.g., from client(s) 135). In one embodiment, the dashboard 101 is implemented and executed by one or more processor(s) 129. In one embodiment, the dashboard 101 includes a project data manager 103, a data mining module 105, a data analysis module 107, and a report generation module 137. Each of the manager 103 and modules 105, 107, and 137 is described in further detail below.

Software development system 100 further includes project management system 111, which can be executed by one or more processors in memory 131. Project management is the process and activity of planning, organizing, motivating, and controlling resources, procedures, and protocols to achieve specific goals in scientific or daily problems. A project is a temporary endeavor designed to produce a unique product, service or result with a defined beginning and end (usually time-constrained, and often constrained by funding or deliverables) undertaken to meet unique goals and objectives, typically to bring about beneficial change or added value. The temporary nature of projects stands in contrast with business as usual (or operations), which are repetitive, permanent, or semi-permanent functional activities to produce products or services, in practice, the management of these two systems is often quite different, and as such requires the development of distinct technical skills and management strategies.

System 100 also includes product defects system and/or a product testing system 115, each of which can be executed by one or more processors in memory 131. In one embodiment, the product defects system 115 is separate from the product testing system 115. In one embodiment, the dashboard 101 accesses each of the systems 111 and 115 via interfaces 109 and 133. Interfaces 109 and 133 may be application programming interfaces (APIs) or plugin interfaces. In one embodiment, the dashboard 111 can access both systems 111 and 115 using only one of interfaces 109 or 113. In one embodiment, project management system 111 communicates with a project management database 117 that is stored in storage device 130. In one embodiment, product defects system and/or a product testing system 115 communicates with a quality analysis database 123 that is stored in storage device 130. In one embodiment, each of the project management system 111 and the product defects system and/or a product testing system 115 includes information about the software under development that is used to determine one or more patterns or relationships within the information to enable data analysis of the software under development.

In one embodiment, the project management database 117 includes a project defect database 119 and a project test execution database 121. In one embodiment, the project defect database 119 includes, but is not limited to, information about known defects that exist within the software under development at a particular stage of development. In one embodiment, the project test execution database 121 includes, but is not limited to, information about an actual success or fail rate of one or more executed tests on one or more features of the software under development at a particular stage of development. It is to be appreciated that there can be information regarding more than one stage of development.

In one embodiment, the product defects system and/or product testing system 115 is coupled to a quality analysis database 123 that includes data about an expected performance metric of the software under development (e.g., an expected timeline of a plurality of components or features of program code under development). In one embodiment, the database 117 includes, but is not limited to, expected defects database 125 storing information about an expected number of defects that a feature of the software under development is to have at a particular stage of development (e.g., a predetermined number of defects that are to be corrected at one or more development stages that are each associated with a predetermined stage timeline). In one embodiment, the database 123 includes, but is not limited to, an expected test results database 127 including information about an expected amount of risk exposure during execution of a particular feature of the software under development, an expected success rate of a test executed on the feature, or an expected fail rate of a test executed on the feature. In one embodiment, each of the systems 111 or 115 may be implemented as processing logic by one or more processors 129.

In one embodiment, the project data manager 103 is configured to receive data about an actual performance of the software under development. For example, and in one embodiment, the project data manager 103 receives data in a standardized file format (e.g., an XML file) from project management system 111. In one embodiment, the data received by the manager 103 specifies actual defects, risk exposures, or execution success rates that have been observed by the software development team during the development of the software. In a further embodiment, the data received by the manager 103 also specifies the particular stage(s) at which the actual defects, risk exposures, or execution success rates were observed. Other types of information that are associated with software processes as is known are also included in the data received by the manager 103.

Turning briefly to FIGS. 6A-6B, which illustrate exemplary XML files 600 and 650 of the data received by the manager 103, respectively. XML file 600 provides a non-limiting example of data compiled about a feature of software under development. XML file 600 can include, but is not limited to, details about observed defects of the feature of the software under development. Similarly, XML 650 provides a non-limiting example of data compiled about one or more executions of a feature of software under development. XML file 650 can include, but is not limited to, details about failed or successful executions of the feature of the software under development.

With regard again to FIG. 1, the project data manager 103 can pre-process the received data about an actual performance of one or more features of the software under development to organize the data for further analysis by other modules of the dashboard 101. As a first example, and in one embodiment, if the data received by the manager 103 includes information about a source code of the software under development, the manager 103 can process the data received by the manager 103 to obtain documentation information (e.g., Java™ documentation information). As a second example, and in one embodiment, the project data manager 103 can pre-process the data received by the manager 103 to determine certain basic characteristics of the one or more features of the software under development. These basic characteristics include, but are not limited to, the number of comment lines, the number of comment words, and the number of definite articles. In one embodiment, the pre-processed data by the manager 103 is converted into a standardized format (e.g., JavaScript Object Notation (JSON) format) for further processing by a data mining module 105.

Referring now to FIG. 7, which provides a non-limiting example 700 of a pre-processed data received by the manager 103. In one embodiment, the manager 103 receives the data in an XML file and after pre-processing, the XML file is converted into a JSON format. In one embodiment, the manager 103 does not perform pre-processing of the XML files and merely provides the received XML files to the data mining module without the conversion.

With regard again to FIG. 1, in one embodiment, the pre-processed or unprocessed data is provided by the manager 103 to the data mining module 105. In one embodiment, the data mining module 105 performs processing on the data provided by the manager 103 to determine one or more patterns or relationships within the received data based on the data contained in at least one of the product defects system 115 or the product testing system 115. For example, and in one embodiment, the data mining module 105 parses data encoded in the pre-processed XML files in JSON format or the unprocessed XML files to determine expected or actual performance metrics about the software under development using data from the quality analysis database 123. In one embodiment, the data mining module 105 outputs another set of XML files storing the organized raw data for further processing by the data analysis module 107.

Software testing is an investigation conducted to provide stakeholders with information about the quality of the product or service under test. Software testing can also provide an objective, independent view of the software to allow the business to appreciate and understand the risks of software implementation. Test techniques include the process of executing a program or application with the intent of finding software bugs (errors or other defects).

Software testing involves the execution of a software component or system component to evaluate one or more properties of interest. In general, these properties indicate the extent to which the component or system under test meets the requirements that guided its design and development; responds correctly to all kinds of inputs; performs its functions within an acceptable time is sufficiently usable; can be installed and run in its intended environments; and/or achieves the general result its stakeholders desire.

As the number of possible tests for even simple software components is practically infinite, all software testing uses some strategy to select tests that are feasible for the available time and resources. As a result, software testing typically (but not exclusively) attempts to execute a program or application with the intent of finding software bugs (errors or other defects). Software testing can provide objective, independent information about the quality of software and risk of its failure to users and/or sponsors. Software testing can be conducted as soon as executable software (even if partially complete) exists. The overall approach to software development often determines when and how testing is conducted.

In one embodiment, the data analysis module 107 is configured to analyze the raw data XML files using an algorithm or a rule stored within a lookup database (also called rule engine). In one embodiment, the data analysis module 107 fetches the data encoded in the raw XML files, compares the fetched data to pre-set criteria determined by the algorithm or rule, determines a correlation between an expected performance metric and an actual performance metric of a feature of the software under development. In one embodiment, the data analysis module 107 provides the results of the comparison to a report generation module 137 for further processing.

In one embodiment, the report generation module 137 creates an analytic report based on the analyzed raw data files. For example, and in one embodiment, the analytic report is generated as a table, a pie chart, or a bar chart showing a correlation between an expected performance of a feature of the software under development and an actual performance of the feature. In one embodiment, the analytic report can be reviewed by a stakeholder for decision-making. In one embodiment, the report generation module 137 determines a historical trend of the correlation based on previously stored output from the data analysis module 107 (e.g., the analyzed raw data XML files).

Figure 2:
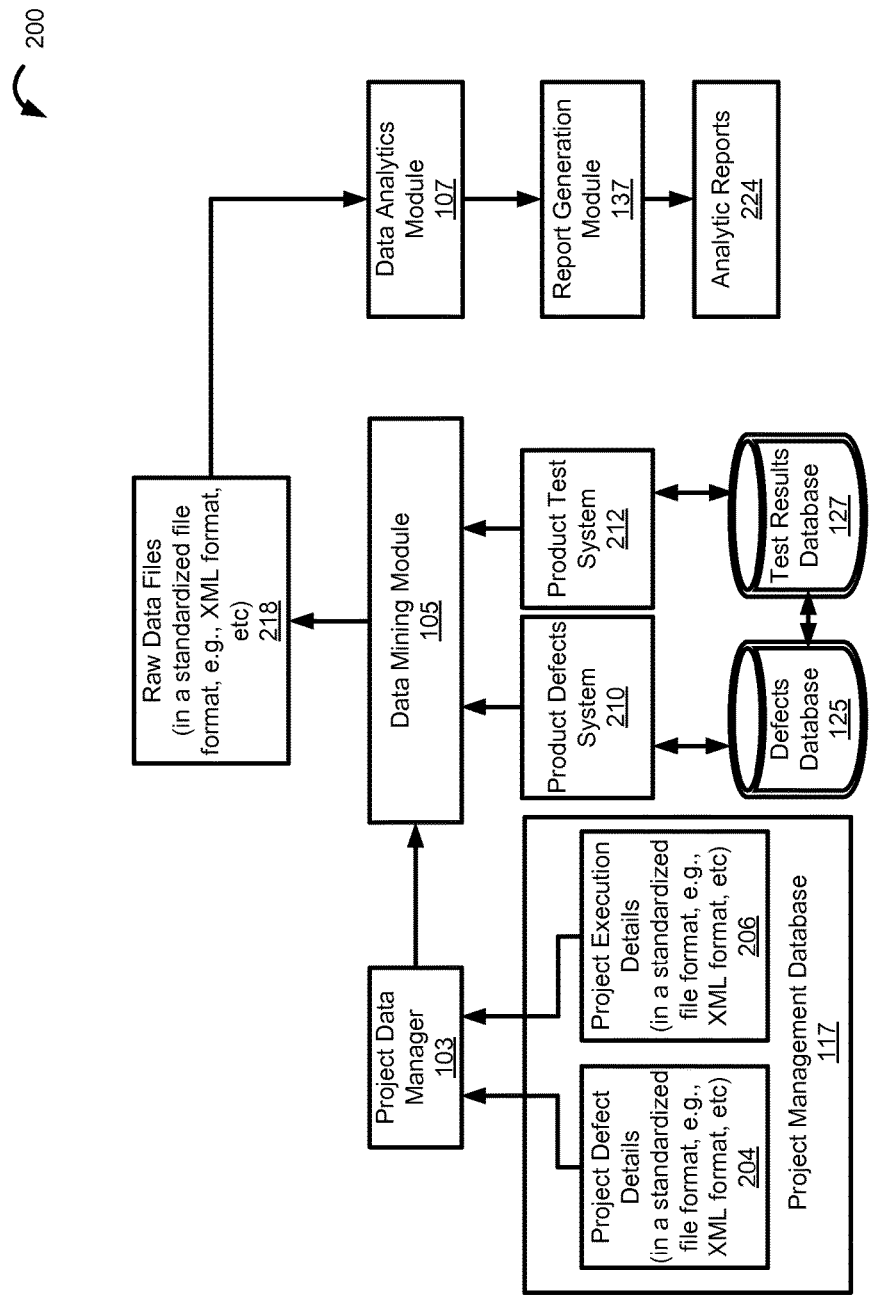
FIG. 2 is a block diagram illustrating a storage system capable of performing data analytics on software under development according to one embodiment of the invention.

FIG. 2 is a block diagram illustrating a software development system 200 capable of performing data analytics on software under development according to one embodiment of the invention. In FIG. 2, additional details are provided about the storage system 100 illustrated in FIG. 1.

In one embodiment of system 200, the data mining module 105 receives the project defect details 204 and the project execution details 206 from the project data manager 103. As explained above in FIG. 1, the project defect details 204 and the project execution details 206 are stored in a project management database 117. Moreover, in one embodiment, the data mining module 105 obtains data from the product defects system 210 and the product test system 212. In contrast with the product defects system 115 and/or product testing system 115 of FIG. 1, which are combined into a single system, each of the product defects system 210 and the product test system 212 are separate systems that are distinct from one another.

In one embodiment, the data mining module 105 combines the project defect details 204, the project execution details 206, the data of the defects database 125, and the data of the test results database 127 to generate an organized set of data for further analysis. In one embodiment, and as explained above in FIG. 1, the organized data can be presented as raw data files 218 in a standardized format (e.g., an XML format, etc.).

In one embodiment, the raw data files 218 are provided to the data analytics module 107, where the files are parsed or analyzed based on an algorithm or rule that is stored within the module 107. In one embodiment, the output of the data analytics module 107 is provided to report generation module 137 and used to create analytic reports 224. Each of the data analytics module 107, report generation module 137, and the analytic reports 224 are discussed above in connection with FIG. 1.

Figure 3:
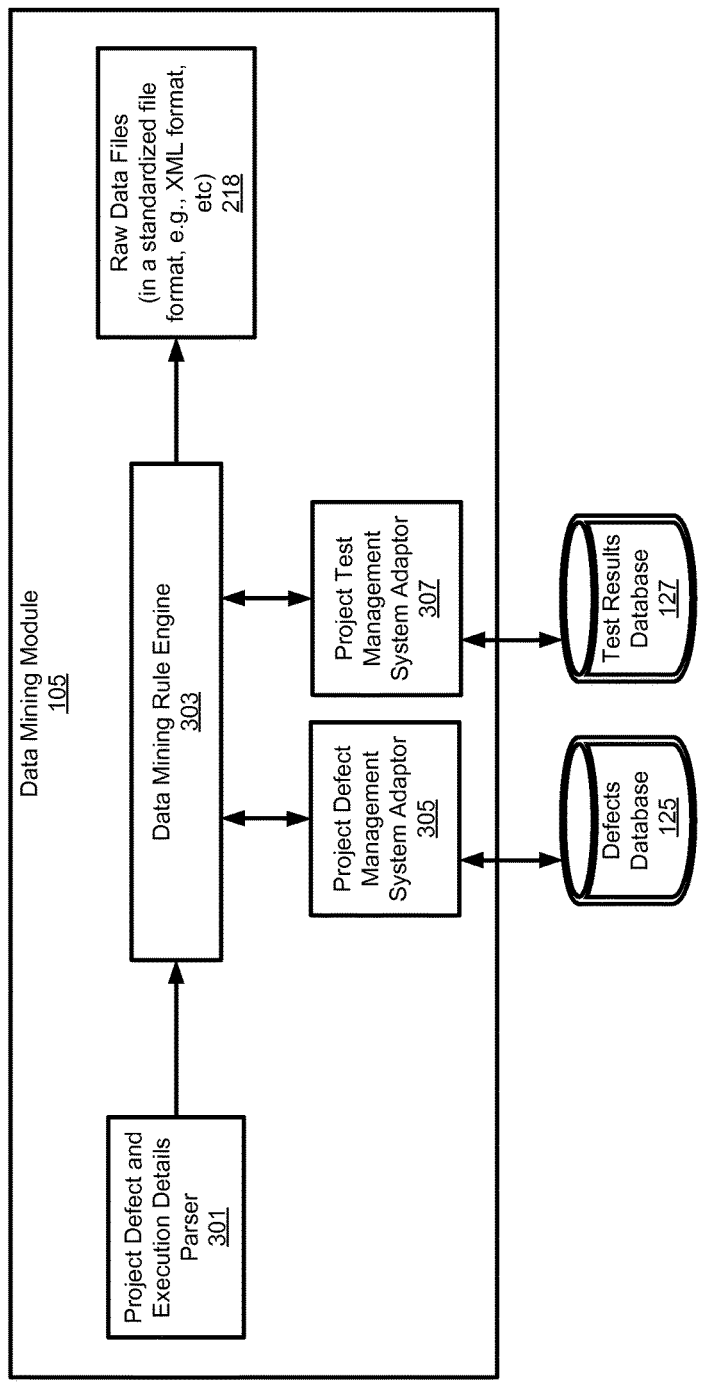
FIG. 3 is a block diagram illustrating a functioning of a data mining module with a defects database and a test results database according to one embodiment of the invention.

FIG. 3 is a block diagram illustrating a functioning of a data mining module 105 with a defects database 125 and a test results database 127 according to one embodiment of the invention. FIG. 3 provides additional details about the system 100 discussed above in connection with FIG. 1.

In one embodiment, the data mining module 105 includes a project defect and execution details parser 301, a data mining rule engine 303, a project defect management system adaptor 305, a project test management system adaptor 307, and raw data files 218. In one embodiment, the parser 301 is used for pre-processing the data encoded in the project defect details 204 and the project execution details 206, as described above in connection with FIG. 2. In one embodiment, the parsed data is provided to a data mining rule engine 303, which is executed by one or more processors of system 100 or 200. In one embodiment, rule engine 303 includes algorithms and rules for driving the defects and test management system adaptors 305 and 307 to obtain information from the defects database 125 and the test results database 127. In one embodiment, the rule engine 303 is configured to request specific data from the databases 125 and 127. For example, and in one embodiment, the rule engine 303 includes an algorithm for determining an expected defect backlog for a feature of software under development.

In one embodiment, the information obtained through adaptors 305 and 307 is further processed by rule engine 303 together with the parsed information obtained from parser 301 to generate the raw data files 218. Raw data files are described above in connection with FIG. 2.

Figure 4:
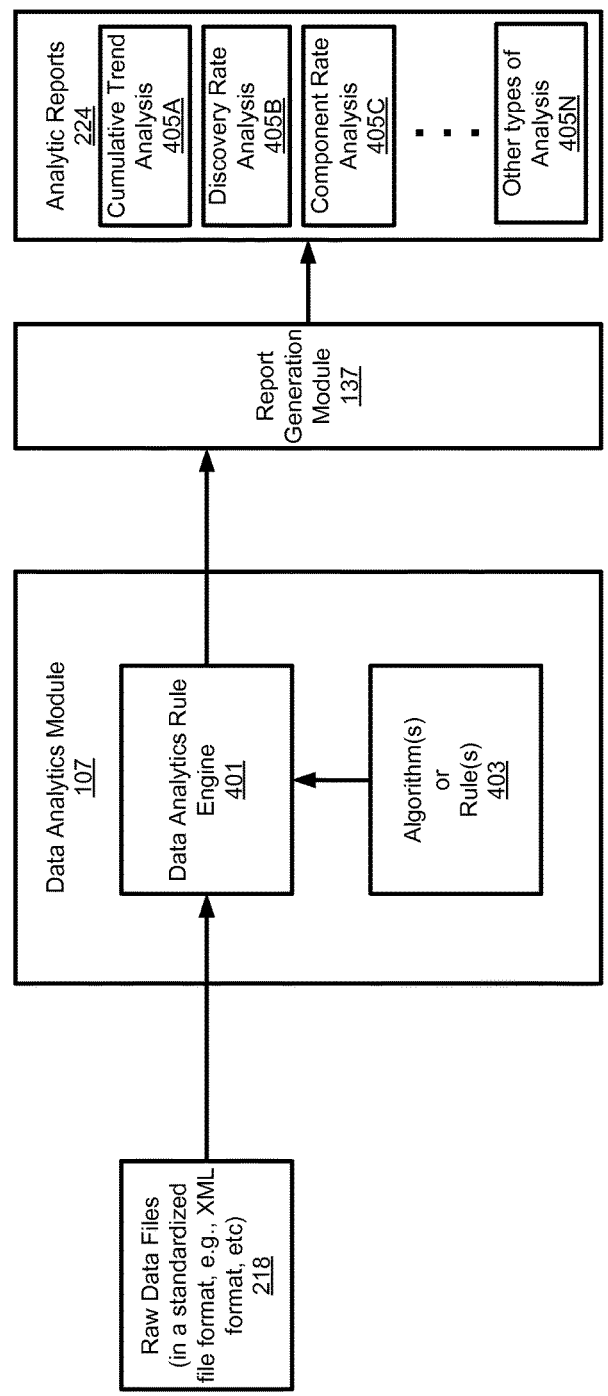
FIG. 4 is a block diagram illustrating a functioning of a data analytics module with a a report generation module according to one embodiment of the invention.

FIG. 4 is a block diagram illustrating a functioning of a data analytics module 107 with a report generation module 137 according to one embodiment of the invention. In one embodiment, the raw data files 218 generated by the data mining rule engine 303 are provided to the data analytic module 107.

In one embodiment, the data analytics module 107 includes a data analytics rules engine 401 and a set of algorithm(s)/rule(s) 403, which may be user configurable via a user interface. In one embodiment, the rule engine 401 processes the raw data files 218 based on the algorithm(s)/rule(s) 403. In one embodiment, the analysis by the rule engine 401 includes applying at least one of a rule 403 or an algorithm 403 stored in the data analysis module 107 to the raw data files 218. In one embodiment, output from the rule engine 303 is provided to the report generator module 137, which generates one or more analysis reports 224 based on the analyzed data. In one embodiment, the analytic report(s) 224 includes at least one of an cumulative trend analysis 405A, a discovery rate analysis 405B, or a component rate analysis 405C, and other types of analysis 405N that are known in the art of software testing. For example, and in one embodiment, the analysis can include a trend analysis of the expected and actual defect levels over a predetermined period of time for each of a plurality of development stages for the software under development. In one embodiment, the data analytics rules engine compares, for each of a plurality of development stages for the software under development, an expected defect level and an actual defect level and provides the results of the comparison to the report generation module 137. In one embodiment, the report generation module 137 indicates, in an analytic report 224, whether the corresponding development stage is on track.

FIG. 5 is a table 500 illustrating an end result of data analytics performed on software under development according to one embodiment of the invention. In one embodiment, table 500 is included in a report generated by the report generation module 137 described above in at least one of FIG. 1, 2, 3, or 4.

In one embodiment, table 500 is a result generated by the report generation module 137 based on its analysis and correlation of several performance metrics to present information about a feature X of software under development. In one embodiment, the table 500 includes a phase 501 that indicates a plurality of development stages associated with a specific stage of production of the software under development. For example, T0 could be the coding development stage during an implementation stage of the software under test, T1 could be the verification development stage during an implementation stage of the software under test, T2 could be the unit testing development stage during an implementation stage of the software under test verification, T3 could be the integration testing development stage during an implementation stage of the software under test verification, and so on. In one embodiment, the table 500 includes at least one of an expected pass rate 503 for each of the phases 501, an defect backlog 505 for each of the phases 501, or an expected delivery 507 for each of the phases 501. In one embodiment, the expected pass rate 503 indicates the number of times that feature X should have been successfully executed. In one embodiment, the expected defect backlog 505 indicates the number of defects that feature X should have at each phase 501 in order for the project to be completed on time. In one embodiment, the expected delivery 507 indicates the amount of feature X that should be successfully completed without any errors or need for additional coding, verification, or testing.

In one embodiment, table 500 includes at least one of an actual pass rate 509 of Feature X for each of the phases 501, an actual defect backlog 511 for each of the phases 501, or an actual delivery 513 for each of the phases 501. In one embodiment, the actual pass rate 509 indicates the number of times that feature X has actually been successfully executed. In one embodiment, the actual defect backlog 511 indicates the number of actual defects within feature X at each phase 501. In one embodiment, the actual delivery 513 indicates the actual amount of feature X that has been successfully completed without any errors or need for additional coding, verification, or testing.

In one embodiment, table 500 includes a final status report 515, which indicates a judgment about the development of feature X. As shown in table 500, during phase T0, feature X was on track to be finished on time; during phase T1, feature X was slightly off track t was expected to have been successfully executed 70% of the time, but was only successfully executed 63% of the time; during phase T2, feature X was on track; and during phase T3, During phase T2, feature X was ready to be deployed.

Figure 8:
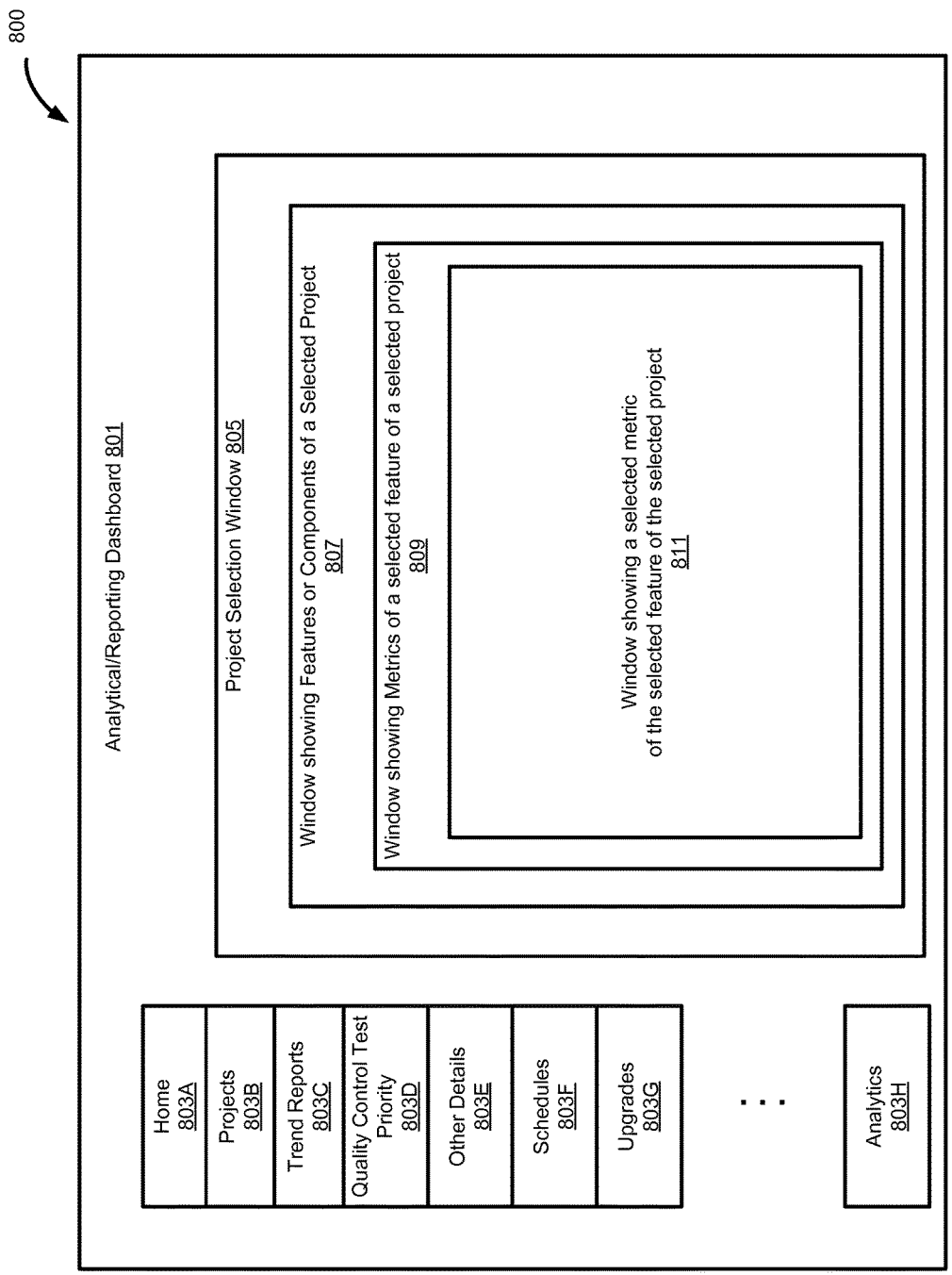
FIG. 8 is a graphical diagram illustrating a non-limiting example of a graphical user interface (GUI) that can be used for performing or presenting one or more results of data analytics performed on software under development according to one embodiment.

FIG. 8 is a graphical diagram illustrating a non-limiting example of a graphical user interface (GUI) 800 that can be used for performing or presenting one or more results of data analytics performed on software under development according to one embodiment.

The GUI 800 is a user interface presented on a display device (e.g., a touchscreen of client 135 of FIG. 1). In one embodiment, an input device of client 135 of FIG. 1 (e.g., a touchscreen) is used to provide requests for the performance of data analysis of one or more features of a software under development, as described above in at least one of FIG. 1, 2, 3, 4, or 5.

In one embodiment, GUI 800 includes the dashboard 801. In one embodiment, the dashboard 801 includes all of the information needed to request data analysis and review generated reports. In one embodiment, the dashboard 801 may represent dashboard 101 of FIG. 1. GUI 800 includes a plurality of selectable GUI objects 803A-H that may be selected based on a receipt of a user input by a client (e.g., client 135) presenting GUI 800 on its display device. As a first example, and in one embodiment, the selection of the GUI object 803A would trigger the system presenting a home page of the dashboard 101. As a second example, and in one embodiment, the selection of the GUI object 803C would trigger the system presenting a trend reports for a feature based on previously analyzed data about the feature. It is to be appreciated that those in the art understand that one or more functionalities of the embodiments described herein can be triggered using the GUI objects 803H. For the sake of brevity, only two non-limiting examples have been provided.

In one embodiment, the GUI 800 also includes a plurality of objects for presenting information about the software under development. For example, and in one embodiment, each of the windows 805, 807, 809, and 811 presents increasing details about the software under development. Specifically, window 805 presents general information about the software under development; window 807 presents each of the features of the software under development; window 809 presents metrics for a selected one of the features of the software under development; and window 811 presents a selected metric for a specific feature of the software under development. It is to be appreciated that GUI 800 can be include more or less elements than are described. GUI 800 can include any known graphical user interface objects.

Figure 9:
FIG. 9 is a graphical representation of a table that may be included in a report generated based on one or more results of data analytics performed on software under development according to one embodiment.

FIG. 9 is a graphical representation of an execution report table 900 that may be included in a report generated based on one or more results of data analytics performed on software under development according to one embodiment.

In one embodiment of table 900, information about executions of software under development is presented. As shown in table 900, submittal column 901 indicates the number of executions in consecutive order from number one to number 13. At each submittal, there is a column 903 indicating a total number of components for the software under development. For example, at submittal #1, the software under development included a total of 265 features that were tested during the execution of the software. The next column 905 indicates the number of features that ran successfully during the execution. For example, at submittal #2, 401 out of 567 features operated successfully during execution of the software under development. The third column 907 indicates the features that were blocked from operating during the execution. This could be done because a feature is incomplete or does not include enough code to be operational. In order to avoid unnecessary resources being allocated to such features, these incomplete features may be blocked during execution. The following column 909 indicates the number of features that failed to operate as required during execution. For example, at submittal #8, 89 out of 1415 features failed to operate properly during execution. The column 911 indicates featured that did not run, even though they were programmed to. The column N/A 913 indicates features that were unavailable during the execution. The column 915 indicates features that were not completed.

In one embodiment, the columns 917 and 919 indicate the test execution exposure rate and the test success rate, respectively. The test execution exposure rate indicates the rate at which features of the software under development execute properly or improperly. For example, at submittal #1, 96% of the features of the software under test execute properly. The test success rate indicates the number of the properly executed features of the software under development that are successfully operational. For example, at submittal #1, 80% of the properly executed features of the software under test are successfully operational.

FIGS. 10A-10D are charts illustrating data metrics that may be included a report generated based on one or more results of data analytics performed on software under development according to one embodiment.

Figure 10A:
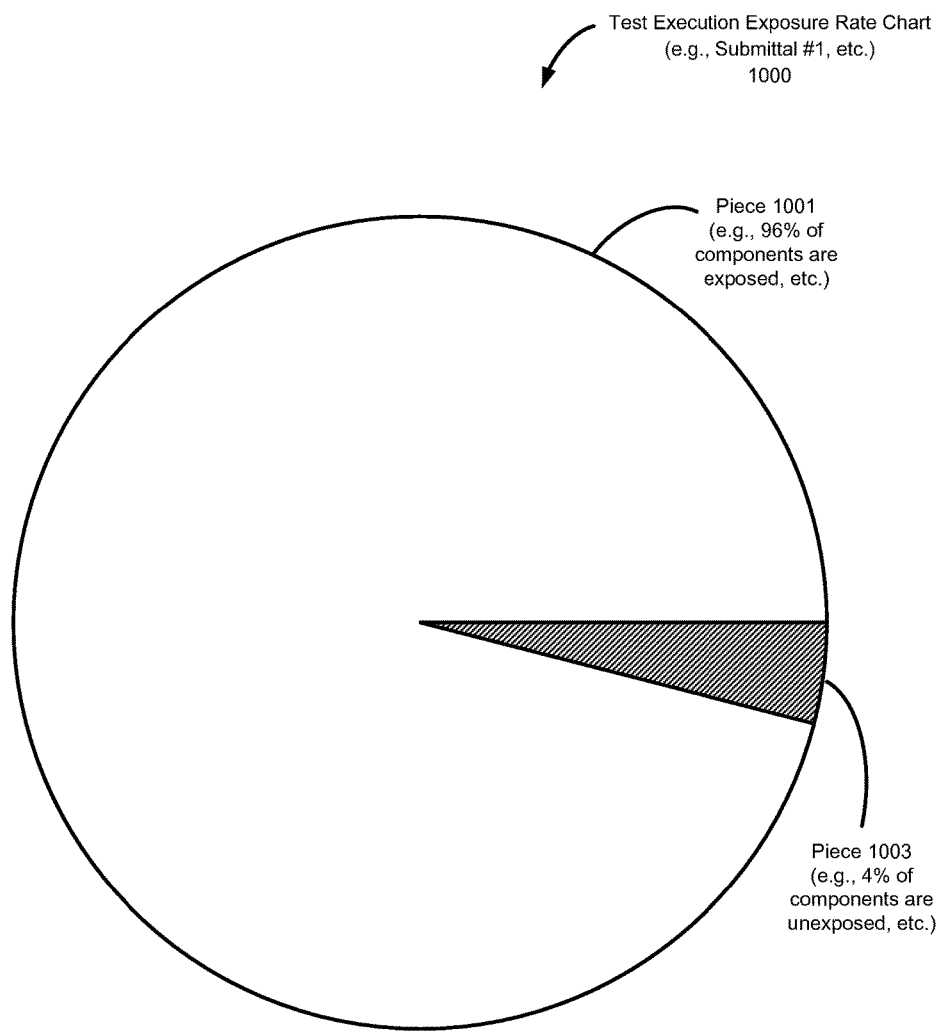
FIGS. 10A-10D are charts illustrating data metrics that may be included a report generated based on one or more results of data analytics performed on software under development according to one embodiment.

FIG. 10A is an exemplary pie chart 1000 indicating the test exposure rate of an executed software under test. For example, the pie chart 1000 indicates, based on submittal #1, that 95% of the features of the software under test execute properly, and 4% of the features of the software under test execute improperly. Piece 1001 represents the features of the software under test that were executed properly and piece 1003 represents the features of the software under test that were executed improperly.

Figure 10B:
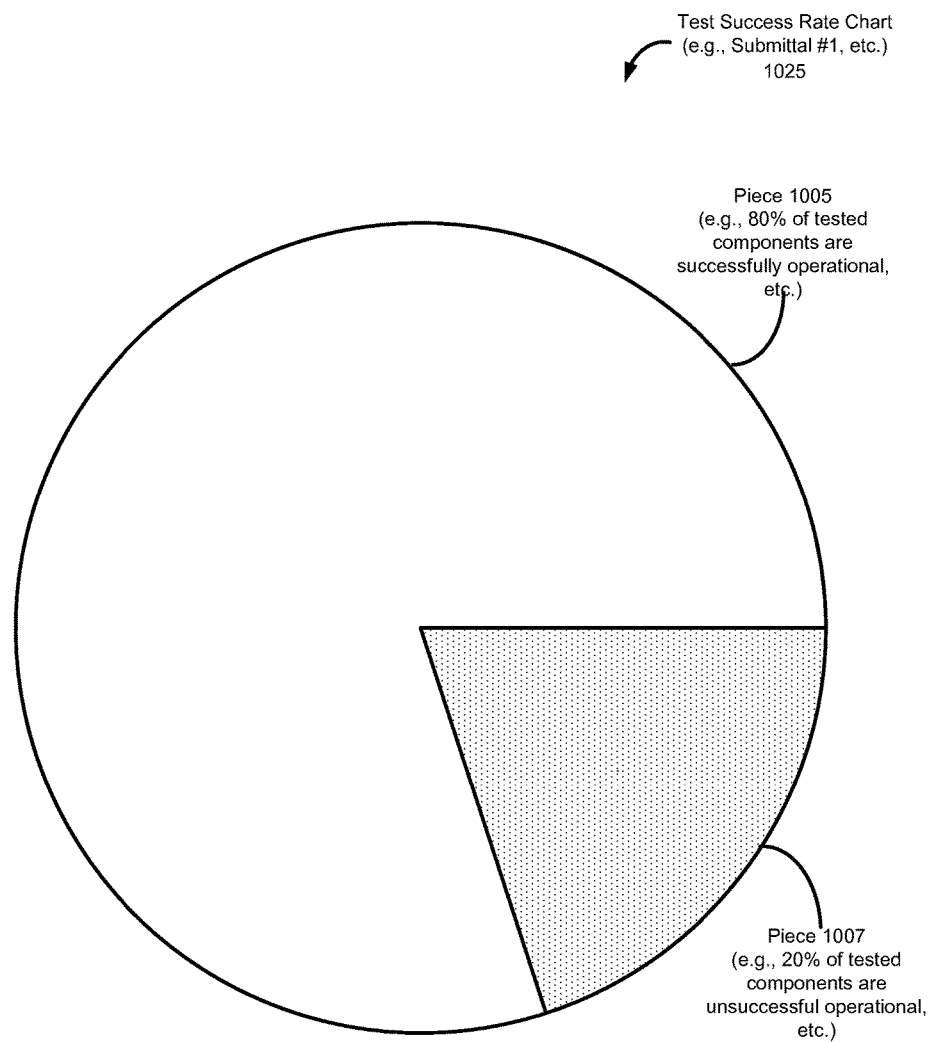

FIG. 10B is an exemplary pie chart 1025 indicating the test success rate of executed software under test. For example, the pie chart 1025 indicates, based on submittal #1, that the 80% of the features of the software under test that were executed properly are successfully operational, while 20% of the features of the software under test that were executed properly are unsuccessfully operational. Piece 1005 represents the successfully operational features and piece 1007 represents the unsuccessfully operational features.

Figure 10C:
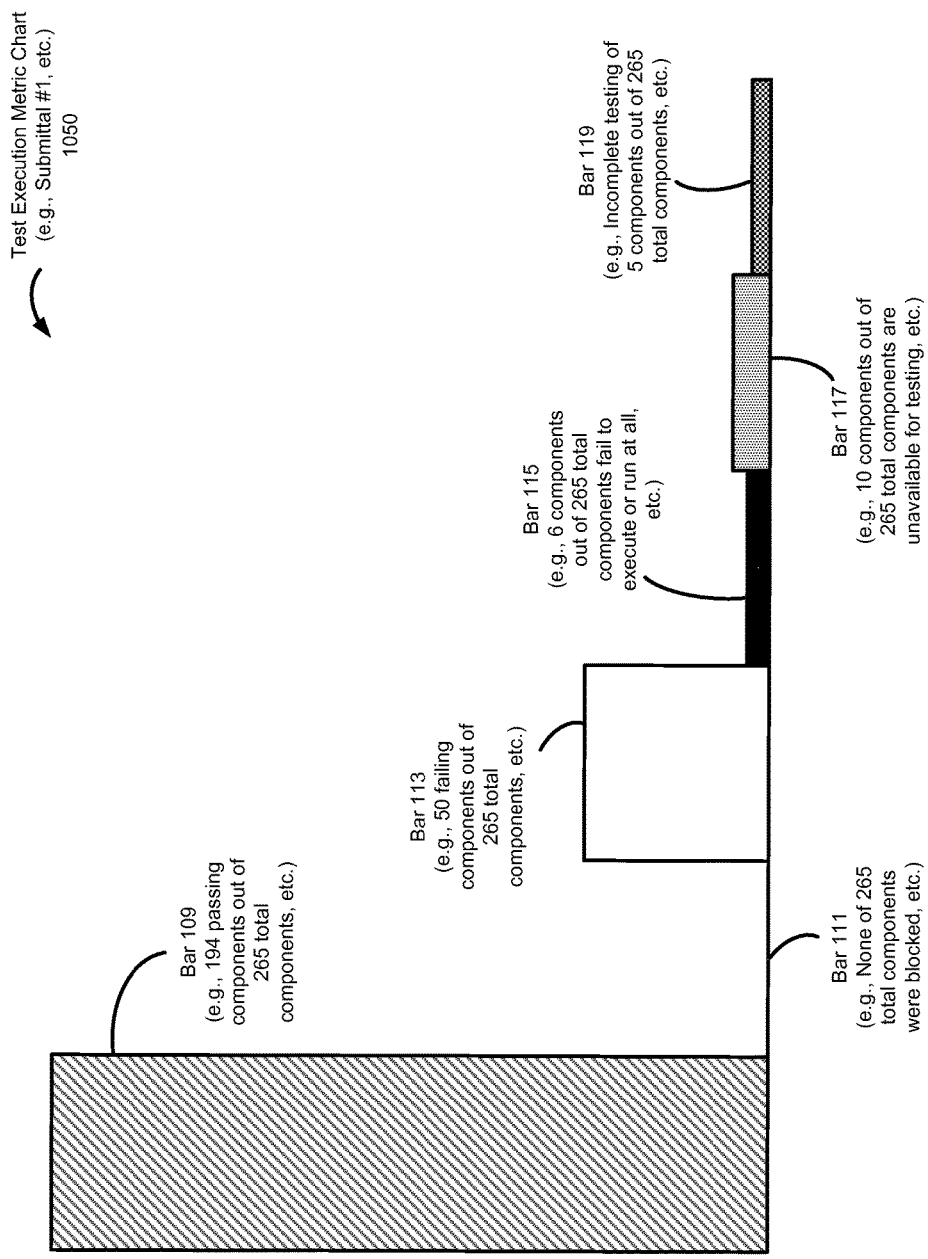

FIG. 10C is an exemplary bar chart 1055 indicating the several characteristics ascertained from an execution of software under test. For example, the bar chart 1050 indicates, based on submittal #1, that the 194 of 265 components passed the tests, none of the components was blocked, 50 components failed, 6 components failed to run, 10 components were unavailable for testing, and 5 components were not completely tested. Bar 109 represents the components that passed the tests. Bar 111 represents the components that were blocked. Bar 113 represents the components that failed the tests. Bar 115 represents that components that failed to execute or run. Bar 117 represents the components that were unavailable for testing. Bar 119 represents the components whose tests were incomplete.

Figure 10D:
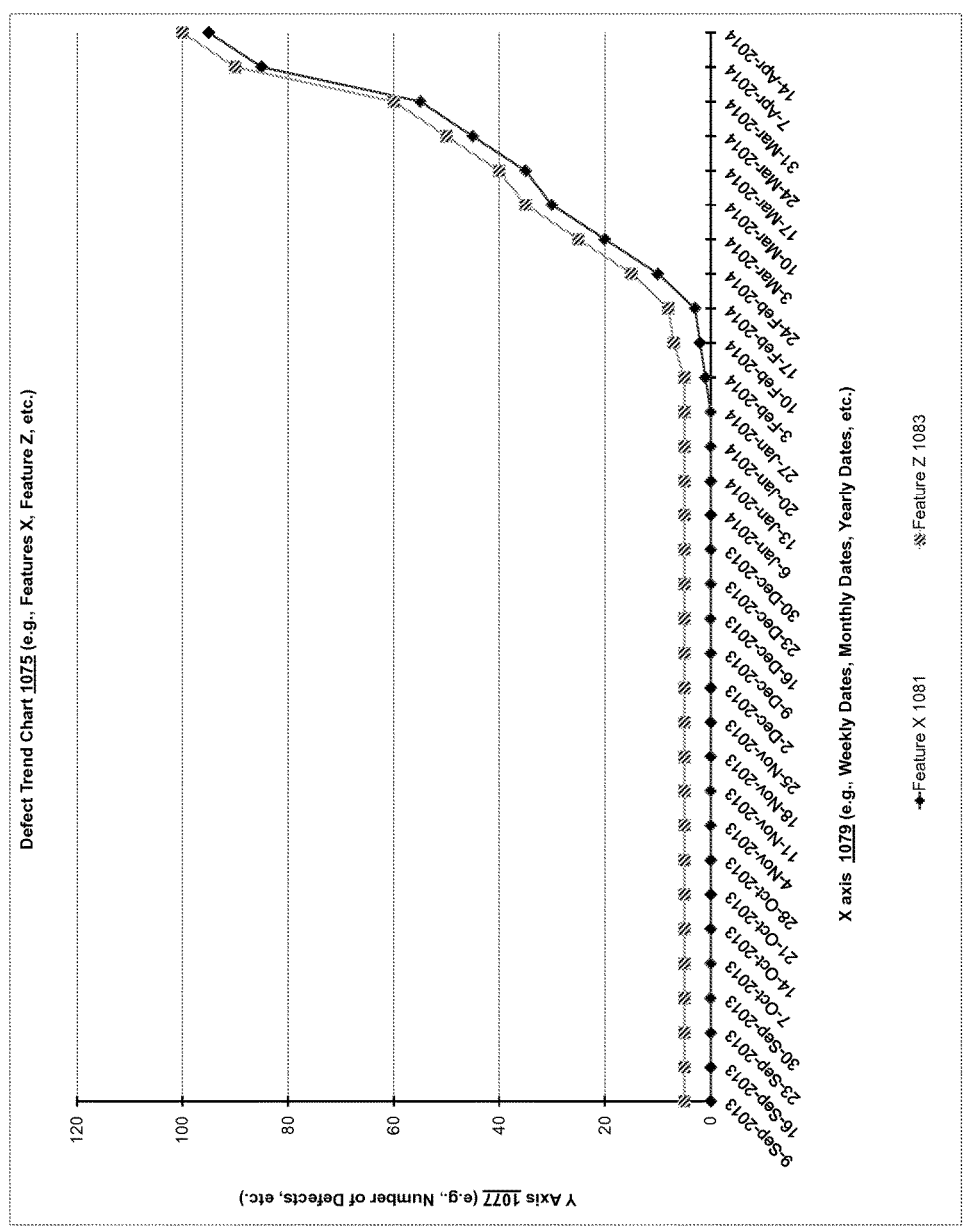

FIG. 10D is an exemplary line chart 1075 indicating a trend analysis of a plurality of executions of two features (feature X and feature Z) of a software under test over a period of time. For example, the line chart 1075 indicates, based on historical data of feature X 1081 and feature 1083 that the number of defects affecting features X and Z increased between Feb. 17, 2014 and Apr. 14, 2014.

Figure 11:
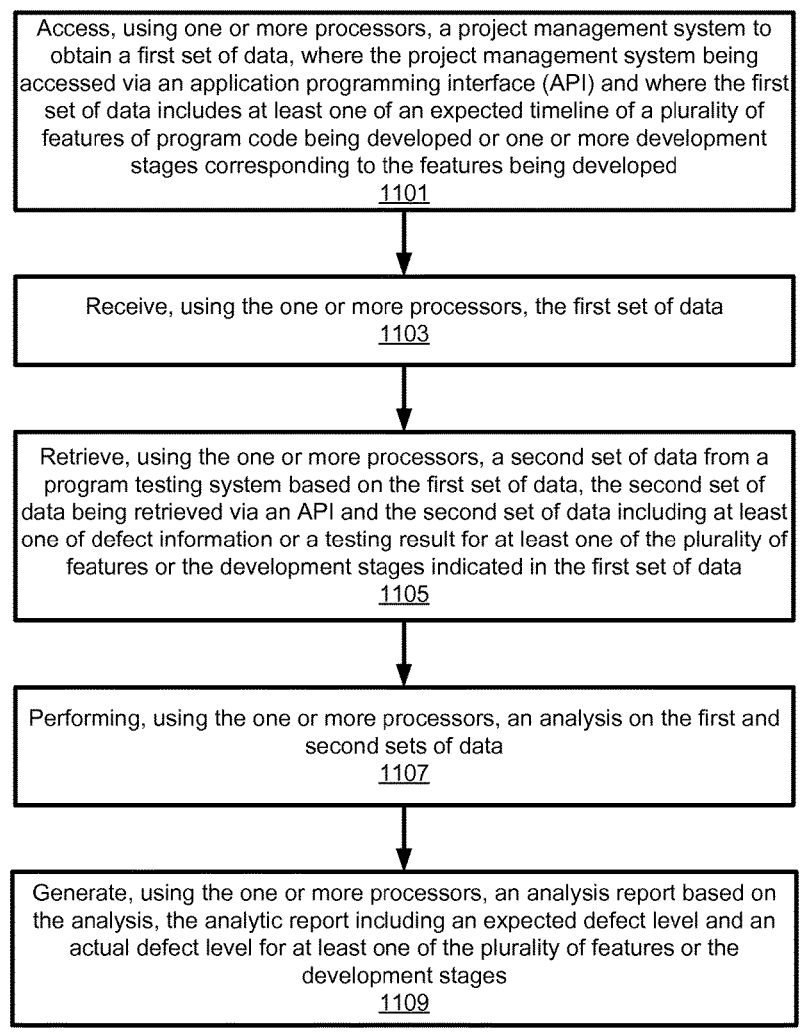
FIG. 11 is a flow diagram illustrating a process of performing data analytics performed on software under development according to one embodiment.

FIG. 11 is a flow diagram illustrating a process 1100 of performing data analytics performed on software under development according to one embodiment. The process 1100 can be performed by one or more processor (e.g., the processor(s) 129 of FIG. 1).

Process 1100 begins at block 1101. In one embodiment, at block 1101, the one or more processors performing process 1100 access a project management system to obtain a first set of data. In one embodiment, the project management system is accessed via interface (e.g., an API or plugin interface). In one embodiment, the first set of data includes at least one of an expected timeline of a plurality of features of program code being developed or one or more development stages corresponding to the features being developed. In one embodiment, block 1101 is performed in accordance with the description of the data mining module 105, the product defects system 210, the projects test system 212, the quality analysis database 123, described above in connection with at least one of FIG. 1 or 2 or 3.

In one embodiment, at block 1103, the one or more processors performing process 1100 receive the first set of data. In one embodiment, block 1103 is performed in accordance with the description of the data mining module 105, the product defects system 210, the projects test system 212, the quality analysis database 123, described above in connection with at least one of FIG. 1 or 2 or 3.

In one embodiment, at block 1105, the one or more processors performing process 1100 retrieve a second set of data from a program testing system based on the first set of data. In one embodiment, the second set of data is retrieved via an API (or plugin interface). In one embodiment, the second set of data includes at least one of defect information or a testing result for at least one of the plurality of features or the development stages indicated in the first set of data. In one embodiment, block 1105 is performed in accordance with the description of the data mining module 105, the project management database 117, the project defect database 119, the project test execution database 121, the project defect details 204, and the project execution details 206, described above in connection with at least one of FIG. 1 or 2 or 3.

In one embodiment, at block 1107, the one or more processors performing process 1100 perform an analysis on the first and second sets of data. In one embodiment, block 1107 is performed in accordance with the description of the data analysis module 107, the data analytics rule engine 401, and the algorithm(s)/rule(s) 403, described above in connection with at least one of FIG. 1 or 2 or 4.

In one embodiment, at block 1109, the one or more processors performing process 1100 generate an analysis report based on the analysis. In one embodiment, the analytic report includes an expected defect level and an actual defect level for at least one of the plurality of features or the development stages. In one embodiment, block 1109 is performed in accordance with the description of the report generation module 137, the analytic reports 224, analysis reports 405A-N, table 500, chart 1000, chart 1025, chart 1050, and chart 1075, described above in connection with at least one of FIG. 1 or 2 or 4 or 5 or 10A-D.

Figure 12:
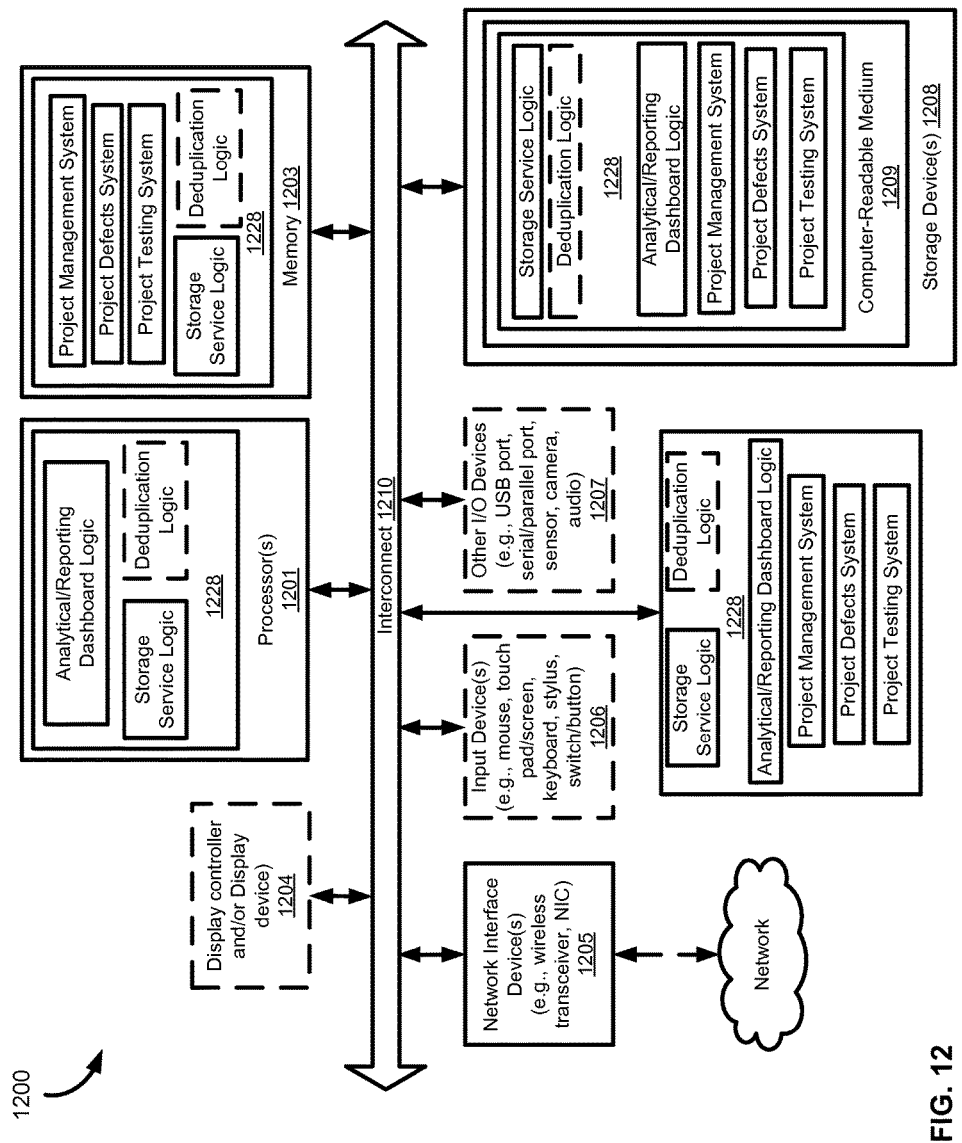
FIG. 12 is a block diagram illustrating a data processing system according to one embodiment that may be used for or included in an apparatus for performing data analytics on software under development.

FIG. 12 is a block diagram illustrating a data processing system 1200 according to one embodiment that may be used for or included in an apparatus for performing data analytics on software under development. For example, system 1200 may represent any of data processing systems described above performing any of the processes or methods described above. System 1200 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1200 is intended to show a high level view of many components of the computer system. However, it is to be understood that additional components may be present in certain implementations and furthermore, different arrangement of the components shown may occur in other implementations. System 1200 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1200 includes processor 1201, memory 1203, and devices 1205-1208 via a bus or an interconnect 1210. Processor 1201 may represent a single processor or multiple processors with a single processor core or multiple processor cores included therein. Processor 1201 may represent one or more general-purpose processors such as a microprocessor, a central processing unit (CPU), or the like. More particularly, processor 1201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1201 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1201, which may be a low power multi-core processor socket such as an ultra-low voltage processor, may act as a main processing unit and central hub for communication with the various components of the system. Such processor can be implemented as a system on chip (SoC). Processor 1201 is configured to execute instructions for performing the operations and steps discussed herein. System 1200 may further include a graphics interface that communicates with optional graphics subsystem 1204, which may include a display controller, a graphics processor, and/or a display device.

Processor 1201 may communicate with memory 1203, which in one embodiment can be implemented via multiple memory devices to provide for a given amount of system memory. Memory 1203 may include one or more volatile storage (or memory) devices such as random access memory (RAM), dynamic RAM (DRAM), synchronous DRAM (SDRAM), static RAM (SRAM), or other types of storage devices. Memory 1203 may store information including sequences of instructions that are executed by processor 1201, or any other device. For example, executable code and/or data of a variety of operating systems, device drivers, firmware (e.g., input output basic system or BIOS), and/or applications can be loaded in memory 1203 and executed by processor 1201. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1200 may further include IO devices such as devices 1205-1208, including network interface device(s) 1205, optional input device(s) 1206, and other optional IO device(s) 1207. Network interface device 1205 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1206 may include a mouse, a touch pad, a touch sensitive screen (which may be integrated with display device 1204), a pointer device such as a stylus, and/or a keyboard (e.g., physical keyboard or a virtual keyboard displayed as part of a touch sensitive screen). For example, input device 1206 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1207 may include an audio device. An audio device may include a speaker and/or a microphone to facilitate voice-enabled functions, such as voice recognition, voice replication, digital recording, and/or telephony functions. Other IO devices 1207 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1207 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1210 via a sensor hub (not shown), while other devices such as a keyboard or thermal sensor may be controlled by an embedded controller (not shown), dependent upon the specific configuration or design of system 1200.

To provide for persistent storage of information such as data, applications, one or more operating systems and so forth, a mass storage (not shown) may also couple to processor 1201. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1201, e.g., via a serial peripheral interface (SPI). This flash device may provide for non-volatile storage of system software, including a basic input/output software (BIOS) as well as other firmware of the system.

Storage device 1208 may include computer-accessible storage medium 1209 (also known as a machine-readable storage medium or a computer-readable medium) on which is stored one or more sets of instructions or software (e.g., module, unit, and/or logic 1228) embodying any one or more of the methodologies or functions described herein. Module/unit/logic 1228 may also reside, completely or at least partially, within memory 1203 and/or within processor 1201 during execution thereof by data processing system 1200, memory 1203 and processor 1201 also constituting machine-accessible storage media. Module/unit/logic 1228 may further be transmitted or received over a network via network interface device 1205.

Computer-readable storage medium 1209 may also be used to store the some software functionalities described above persistently. While computer-readable storage medium 1209 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1228, components and other features described herein can be implemented as discrete hardware components or integrated in the functionality of hardware components such as ASICS, FPGAs, DSPs or similar devices. In addition, module/unit/logic 1228 can be implemented as firmware or functional circuitry within hardware devices. Further, module/unit/logic 1228 can be implemented in any combination hardware devices and software components.

Note that while system 1200 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving by a data mining module executed by one or more processors, a first set of data including an expected timeline of a plurality of features of program code being developed;
   retrieving, by the data mining module executed by the one or more processors, a second set of data from a program testing system based on the first set of data, the second set of data being retrieved via a first application programming interface (API) and the second set of data including defect information and a testing result for each of the plurality of features indicated in the first set of data;
   performing, by a data analysis module executed by the one or more processors, an analysis on the first and second sets of data;
   generating, by a report generator executed by the one or more processors, an analysis report based on the analysis, the analytic report including an expected defect level and an actual defect level of each of the plurality of features, wherein the expected timeline of the first set of data includes a plurality of development stages, each being associated with a stage timeline at which a predetermined number of defects are to be corrected;
   for each of the plurality of development stages, comparing the expected defect level and the actual defect level of each of the plurality of features, comprising comparing, for each of the plurality of features, an actual pass rate against an expected pass rate, an actual defect backlog count against an expected defect backlog count, and an actual delivery percentage against an expected delivery percentage; and
   indicating in the analytic report whether the corresponding development stage is on track for each of the plurality of features based on the comparison.

2. The computer-implemented method of claim 1, further comprising:
   accessing, by a project data manager executed by the one or more processors, a project management system to obtain the first set of data, the project management system being accessed via a second API and the project management system being a separate system from the program testing system.

3. The computer-implemented method of claim 1, wherein the second set of data includes an actual defect level for each of the development stages.

4. The computer-implemented method of claim 1, wherein the first and second sets of data are in a format compatible with extensible markup language (XML).

5. The computer-implemented method of claim 1, wherein the retrieval of the second set of data comprises:
   retrieving defect data from a defect database of a product defect system via a third API; and
   retrieving test data from a test result database of a product test management system via a fourth API.

6. A non-transitory computer readable medium comprising instructions, which when executed by a processing system, cause the processing system to perform operations, the operations comprising:
   receiving by a data mining module executed by one or more processors, a first set of data including an expected timeline of a plurality of features of program code being developed;
   retrieving, by the data mining module executed by the one or more processors, a second set of data from a program testing system based on the first set of data, the second set of data being retrieved via a first application programming interface (API) and the second set of data including defect information and a testing result for each of the plurality of features indicated in the first set of data;

performing, by a data analysis module executed by the one or more processors, an analysis on the first and second sets of data;

generating, by a report generator executed by the one or more processors, an analysis report based on the analysis, the analytic report including an expected defect level and an actual defect level of each of the plurality of features, wherein the expected timeline of the first set of data includes a plurality of development stages, each being associated with a stage timeline at which a predetermined number of defects are to be corrected;

for each of the plurality of development stages, comparing the expected defect level and the actual defect level of each of the plurality of features, comprising comparing, for each of the plurality of features, an actual pass rate against an expected pass rate, an actual defect backlog count against an expected defect backlog count, and an actual delivery percentage against an expected delivery percentage; and indicating in the analytic report whether the corresponding development stage is on track for each of the plurality of features based on the comparison.

7. The non-transitory computer readable medium of claim 6, wherein the operations comprise:

accessing, by a project data manager executed by the one or more processors, a project management system to obtain the first set of data, the project management system being accessed via a second API and the project management system being a separate system from the program testing system.

8. The non-transitory computer readable medium of claim 6, wherein the second set of data includes an actual defect level for each of the development stages.

9. The non-transitory computer readable medium of claim 6, wherein the first and second sets of data are in a format compatible with extensible markup language (XML).

10. The non-transitory computer readable medium of claim 6, wherein the retrieval of the second set of data comprises:

retrieving defect data from a defect database of a product defect system via a third API; and retrieving test data from a test result database of a product test management system via a fourth API.

11. A data processing system, the system comprising a processor; and a memory coupled to the processor storing instructions which, when executed by the processor, cause the processor to:

receive by a data mining module executed by the one or more processing devices, a first set of data including an expected timeline of a plurality of features of program code being developed;

retrieve, by the data mining module executed by the one or more processing devices, a second set of data from a program testing system based on the first set of data, the second set of data being retrieved via a first application programming interface (API) and the second set of data including defect information and a testing result for each of the plurality of features indicated in the first set of data;

perform, by a data analysis module executed by the one or more processing devices, an analysis on the first and second sets of data;

generate, by a report generator executed by the one or more processing devices, an analysis report based on the analysis, the analytic report including an expected defect level and an actual defect level of each of the plurality of features, wherein the expected timeline of the first set of data includes a plurality of development stages, each being associated with a stage timeline at which a predetermined number of defects are to be corrected;

for each of the plurality of development stages, comparing the expected defect level and the actual defect level of each of the plurality of features, comprising comparing, for each of the plurality of features, an actual pass rate against an expected pass rate, an actual defect backlog count against an expected defect backlog count, and an actual delivery percentage against an expected delivery percentage; and indicating in the analytic report whether the corresponding development stage is on track for each of the plurality of features based on the comparison.

12. The system of claim 11, wherein the one or more processing devices are further configured to:

access, by a project data manager executed by the one or more processing devices, a project management system to obtain the first set of data, the project management system being accessed via a second API and the project management system being a separate system from the program testing system.

13. The system of claim 11, wherein the second set of data includes an actual defect level for each of the development stages.

14. The system of claim 11, wherein the first and second sets of data are in a format compatible with extensible markup language (XML).

15. The system of claim 11, wherein the one or more processing devices are configured to perform the retrieval of the second set of data by:

retrieving defect data from a defect database of a product defect system via a third API; and retrieving test data from a test result database of a product test management system via a fourth API.

* * * * *